United States Patent
Itaya et al.

(10) Patent No.: US 10,235,107 B2
(45) Date of Patent: Mar. 19, 2019

(54) DISPLAY SYSTEM FOR CONTROLLING POWER STATE OF DISPLAY, IMAGE FORMING APPARATUS, PROGRAM, AND DISPLAY POWER STATE CONTROL METHOD

(71) Applicant: Konica Minolta, Inc., Chiyoda-ku (JP)

(72) Inventors: Shimpei Itaya, Hachioji (JP); Tsutomu Yamazaki, Odawara (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/608,401

(22) Filed: Jan. 29, 2015

(65) Prior Publication Data
US 2015/0242166 A1 Aug. 27, 2015

(30) Foreign Application Priority Data
Jan. 31, 2014 (JP) .................. 2014-017212

(51) Int. Cl.
*G06F 3/12* (2006.01)
*H04N 1/00* (2006.01)

(52) U.S. Cl.
CPC .............. *G06F 3/1221* (2013.01); *G06F 3/12* (2013.01); *G06F 3/1229* (2013.01); *G06F 3/1234* (2013.01); *G06F 3/1292* (2013.01); *H04N 1/00384* (2013.01); *H04N 1/00411* (2013.01); *H04N 1/00896* (2013.01);
(Continued)

(58) Field of Classification Search
None
See application file for complete search history.

(56) References Cited

FOREIGN PATENT DOCUMENTS

| JP | 11-266383 A | 9/1999 |
|---|---|---|
| JP | 2005-101932 | 4/2005 |

(Continued)

OTHER PUBLICATIONS

Notice of Reasons for Rejection issued in corresponding Japanese Patent Application No. 2014-017212, dated Dec. 18, 2015, with English Translation (11 pages). The date was listed incorrectly as 2016 in the previous IDS.

(Continued)

*Primary Examiner* — Marivelisse Santiago Cordero
*Assistant Examiner* — Pawan Dhingra
(74) *Attorney, Agent, or Firm* — Buchanan Ingersoll & Rooney PC

(57) ABSTRACT

A display system includes first and second operation displays, wherein the display system causes the first and second operation displays to perform a cooperative operation, in a case where a predetermined operation has been received via the first operation display when the first operation display is in a power saving display state and the first and second operation displays are not performing the cooperative operation, the state of the first operation display is changed to the normal display state, and in a case where the predetermined operation has been received via the first operation display when the first operation display is in the power saving display state and the second operation display is in the normal display state and the first and second operation displays are performing the cooperative operation, the display system maintains the first operation display in the power saving display state.

21 Claims, 18 Drawing Sheets

(52) U.S. Cl.
CPC .. *H04N 2201/0094* (2013.01); *Y02B 60/1271* (2013.01); *Y02D 10/1592* (2018.01)

(56) References Cited

FOREIGN PATENT DOCUMENTS

| | | | |
|---|---|---|---|
| JP | 2008250132 A | * | 10/2008 |
| JP | 2013-097667 A | | 5/2013 |
| JP | 2013-162387 A | | 8/2013 |
| JP | 2013-184297 | | 9/2013 |

OTHER PUBLICATIONS

Notice of Reasons for Rejection issued in corresponding Japanese Patent Application No. 2014-017212, dated Dec. 18, 2016, with English Translation (11 pages).

Notice of Reasons for Rejection dated Jul. 5, 2016 issued in the corresponding Japanese Patent Application No. 2014-017212 and English translation (10 pages).

\* cited by examiner

DISPLAY SYSTEM FOR CONTROLLING POWER STATE OF DISPLAY, IMAGE FORMING APPARATUS, PROGRAM, AND DISPLAY POWER STATE CONTROL METHOD

The entire disclosure of Japanese Patent Application No. 2014-017212 filed on Jan. 31, 2014 including description, claims, drawings, and abstract are incorporated herein by reference in its entirety.

BACKGROUND OF THE INVENTION

Field of the Invention

The present invention relates to a display system, an image forming apparatus which link two operation displays, a program, and a display state control method.

Description of the Related Art

There is an image forming apparatus which makes an image forming apparatus such as a multifunction machine and a mobile terminal owned by a user perform a cooperative operation, concurrently displays related two screens on an operation panel of the image forming apparatus and the mobile terminal of the user, and can remotely input and set a job by functioning the mobile terminal of the user as a remote operation panel.

Also, there is an image display system in which the remote control is possible while a sleep state is maintained when the image forming apparatus is in the sleep state in a case where the image forming apparatus is remotely controlled (refer to JP 2013-162387 A). There is a system in which a state of the image forming apparatus which is remotely controlled is changed to a power saving state when the image forming apparatus is remotely controlled (refer to JP 2013-097667 A).

In JP 2013-162387 A and JP 2013-097667 A, the sleep state of the image forming apparatus is maintained when the image forming apparatus is remotely controlled. Similarly to this, when the image forming apparatus and the mobile terminal of the user perform the cooperative operation, it is desired that the input and setting of the job be completed from the mobile terminal owned by the user and the like while the power saving state is maintained when the operation panel of the image forming apparatus is in the power saving state.

However, when receiving a certain operation via the operation panel of the image forming apparatus, the conventional image forming apparatus and the like cancels the power saving state. Therefore, when the certain operation is received via the operation panel of the image forming apparatus even when the image forming apparatus and the mobile terminal of the user and the like are performing the cooperative operation, the power saving state of the image forming apparatus is canceled.

For example, when a certain operation of a key such as a start key is performed on the operation panel of the image forming apparatus in a case where the operation panel of the image forming apparatus is in the power saving state and the input and setting of the job is performed from the mobile terminal by making the operation panel and the mobile terminal perform the cooperative operation, the power saving state of the image forming apparatus is canceled without the intention of the user. Since the image forming apparatus initializes each part of the same when the power saving state is canceled, a large power is wastefully consumed.

Also, when the image forming apparatus executes the job in a state where the operation panel of the image forming apparatus is in the power saving state and is performing the cooperative operation with the mobile terminal, an error occurs during the execution of the job. Then, the power saving state of the operation panel of the image forming apparatus is canceled in order to display an error message and the like.

A similar problem may occur when the operation panel and the mobile terminal perform the cooperative operation and the mobile terminal is in the power saving display state. For example, when a greater part of the setting has been performed by the operation panel of the image forming apparatus and a key which is easy to be used is provided on the mobile terminal, the user operates the key with interlocking with the mobile terminal. This cancels the power saving display state even when the mobile terminal is in the power saving display state.

SUMMARY OF THE INVENTION

The present invention is provided to solve the problem, and an object of the present invention is to provide a display system, an image forming apparatus, a program, and a display state control method of the present invention, when two operation displays are performing a cooperative operation and one of the two operation displays is in a power saving state, the power saving state of one of the operation displays is not canceled by a key operation and the like on one of the operation displays against the intention of a user.

The summary of the present invention to achieve the object is described in the following items of the present invention.

[1] To achieve the abovementioned object, according to an aspect, a display system reflecting one aspect of the present invention comprises: a first operation display configured to include an operation unit and a display unit; and a second operation display configured to include an operation unit and a display unit, wherein the display system causes the first and second operation displays to perform a cooperative operation, in a case where a predetermined operation has been received via the first operation display when the first operation display is in a power saving display state where power consumption according to the display is saved less than that of a normal display state and the first and second operation displays are not performing the cooperative operation, the state of the first operation display is changed to the normal display state, and in a case where the predetermined operation has been received via the first operation display when the first operation display is in the power saving display state and the second operation display is in the normal display state and the first and second operation displays are performing the cooperative operation, the display system maintains the first operation display in the power saving display state.

According to the above invention and the invention described in [10], when the predetermined operation is received via the first operation display in a case where the first operation display is in the power saving display state and is not performing the cooperative operation with the second operation display, the power saving display state of the first operation display is canceled. However, when the same operation is received during the cooperative operation, the first operation display maintains the power saving display state.

[2] The display system according to [1], wherein, the first operation display is preferably an operation panel included in an image forming apparatus, and the second operation display is preferably a remote operation panel for remotely controlling the image forming apparatus.

In the above invention, when the predetermined operation is received via the operation panel in a case where the operation panel of the image forming apparatus is in the power saving display state and is not performing the cooperative operation with the remote operation panel, the power saving display state of the operation panel is canceled. Even when the same operation is received during the cooperative operation, the power saving display state of the operation panel is maintained.

[3] The display system according to [1], wherein, the second operation display is preferably an operation panel included in an image forming apparatus, and the first operation display is preferably a remote operation panel for remotely controlling the image forming apparatus.

In the above invention, when the predetermined operation is received via the remote operation panel in a case where the remote operation panel is in the power saving display state and is not performing the cooperative operation with the operation panel of the image forming apparatus, the power saving display state of the remote operation panel is canceled. Even when the same operation is received during the cooperative operation, the power saving display state of the remote operation panel is maintained.

[4] The display system according to [2] or [3], wherein notification information to a user generated by the image forming apparatus during an operation is preferably displayed on the operation panel when the operation panel is in the normal display state, and the notification information is preferably displayed on the remote operation panel when the operation panel and the remote operation panel are performing the cooperative operation, the operation panel is in the power saving display state, and the remote operation panel is in the normal display state.

In the above invention and the invention described in [11], when the operation panel is in the power saving display state and is performing the cooperative operation, the notification information generated during the operation of the image forming apparatus. Therefore, the power saving display state of the operation panel is not canceled, and the notification information is displayed on the remote operation panel.

[5] The display system according to [4], wherein the notification information is preferably detailed information regarding a job being executed.

[6] The display system according to [4], wherein the notification information is preferably error information regarding an error generated during the execution of the job.

[7] The display system according to any one of [1] to [6], wherein the predetermined operation is preferably an operation relative to a predetermined hard key.

[8] The display system according to any one of [1] to [7], wherein the predetermined operation preferably includes a touch operation to a touch panel on the display unit.

[9] The display system according to [8], wherein in a case where the touch operation has been received via the first operation display when the first operation display is in the power saving display state, the second operation display is in the normal display state, and the first and second operation displays are performing the cooperative operation, a selection operation as to whether the power saving display state of the first operation display is canceled is preferably received via the second operation display, and when the operation to cancel the power saving display state has been received, a state of the first operation display is preferably changed to the normal display state.

In the above invention and the invention described in [16], when the first operation display is performing the cooperative operation when the touch operation has been received via the touch panel of the first operation display in the power saving display state, a selection operation as to whether the power saving display state of the first operation display is canceled by the second operation display. Accordingly, the cancel of the power saving display state of the first operation display caused by a wrong touch with no intention of the user is to be avoided.

[10] To achieve the abovementioned object, according to an aspect, an image forming apparatus reflecting one aspect of the present invention comprises: an operation panel configured to include an operation unit and a display unit; a cooperative control unit configured to make an operation display including an operation unit and a display unit perform a cooperative operation with the operation panel; and a display state control unit configured to control the operation displays so that a state of the operation panel is changed to the normal display state in a case where a predetermined operation has been received via the operation panel when the operation panel is in a power saving display state where power consumption according to a display is saved less than that of the normal display state and the operation panel and the operation display are not performing the cooperative operation and the operation display is maintained to be in the power saving display state in a case where the predetermined operation has been received via the operation panel when the operation panel is in the power saving display state and the operation display is in the normal display state and the operation panel and the operation display are performing the cooperative operation.

[11] The image forming apparatus according to [10], wherein it further preferably comprises: a notification information generating unit configured to generate notification information to a user, and the notification information generated by the notification information generating unit during the operation of the image forming apparatus is preferably displayed on the operation panel when the operation panel is in the normal display state, and the notification information generated by the notification information generating unit during the operation of the image forming apparatus is preferably displayed on the operation display when the operation panel is in the power saving display state and the operation display is in the normal display state during the cooperative operation.

[12] The image forming apparatus according to [11], wherein the notification information is preferably detailed information regarding a job being executed.

[13] The image forming apparatus according to [11], wherein the notification information is preferably error information regarding an error generated during the execution of the job.

[14] The image forming apparatus according to any one of [10] to [13], wherein the predetermined operation is preferably an operation relative to a predetermined hard key.

[15] The image forming apparatus according to any one of [10] to [14], wherein the predetermined operation preferably includes a touch operation to a touch panel on the display unit.

[16] The image forming apparatus according to [15], wherein in a case where the touch operation has been received via the operation panel when the operation panel is in the power saving display state and the operation display is in the normal display state and the operation panel and the operation display are performing the cooperative operation, a selection operation as to whether the power saving display state of the operation panel is canceled is preferably received via the operation display, and when the operation to cancel the power saving display state is received, a state of the operation panel is preferably changed to the normal display state.

[17] A non-transitory recording medium storing a computer readable program for causing a first and second operation displays to operate as a display system according to any one of [1] to [9], wherein each of first and second operation displays preferably includes an operation unit and a display unit.

[18] A non-transitory recording medium storing a computer readable program for causing an image forming apparatus to operate as an image processing apparatus according to any one of [10] to [16], wherein the image forming apparatus preferably includes an operation panel having an operation unit and a display unit.

[19] To achieve the abovementioned object, according to an aspect, a display state control method reflecting one aspect of the present invention comprises: in a case where a predetermined operation has been received via a first operation display when the first operation display including an operation unit and a display unit is in a power saving display state where power consumption according to a display is saved less than that of a normal display state and a second operation display including an operation unit and a display unit is not performing a cooperative operation with the first operation display, changing a state of the first operation display to the normal display state; and in a case where the predetermined operation has been received via the first operation display when the first operation display is in the power saving display state and the second operation display is in the normal display state and the first and second operation displays are performing the cooperative operation, maintaining the power saving display state of the first operation display.

BRIEF DESCRIPTION OF THE DRAWINGS

The above and other objects, advantages and features of the present invention will become more fully understood from the detailed description given herein below and the appended drawings which are given by way of illustration only, and thus are not intended as a definition of the limits of the present invention, and wherein.

DESCRIPTION OF THE PREFERRED EMBODIMENTS

Hereinafter, embodiments of the present invention will be described below with reference to the drawings. However, the scope of the invention is not limited to the illustrated examples.

Figure 1:
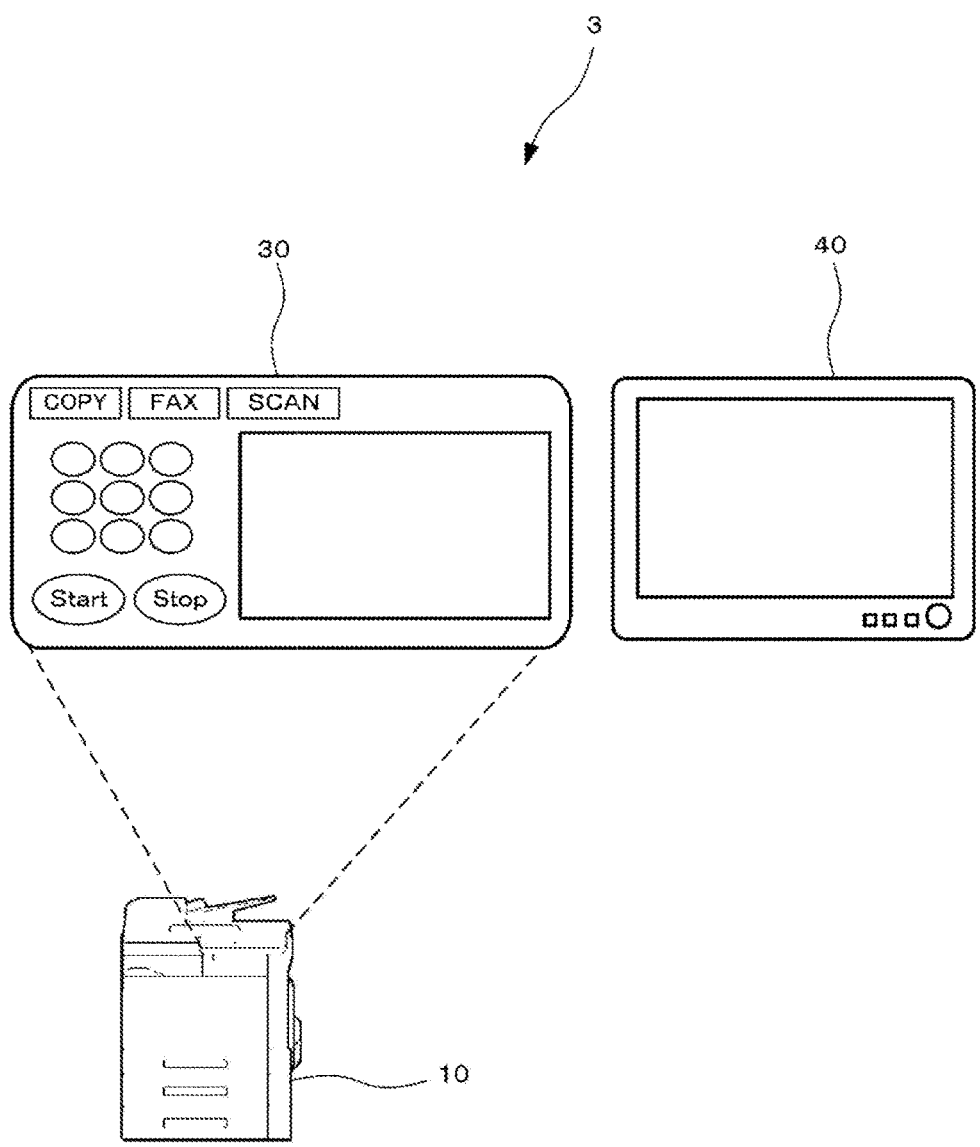
FIG. 1 is a diagram of an exemplary display system according to an embodiment of the present invention.

FIG. 1 is a diagram of an exemplary display system 3 according to an embodiment of the present invention. The display system 3 includes an image forming apparatus 10, which has an operation panel 30 as a first operation display, and a remote operation panel 40 as a second operation display. The remote operation panel 40 is apposed to the operation panel 30 of the image forming apparatus 10 and used.

The image forming apparatus 10 is a so-called multifunction machine including a function to execute a plurality of kinds of jobs. The plurality of jobs includes a copy job for optically reading a document and printing the copied image on recording paper, a scan job for making a file of the image data of the read document and storing it and transmitting it to an external terminal via a network, a print job for forming the image according to the print data received from a terminal device via the network on the recording paper and printing and outputting it, and a FAX job for transmitting/receiving the image data in accordance with a facsimile procedure. In the description below, the image forming apparatus 10 is also expressed as "MFP".

The remote operation panel 40 may be a mobile terminal dedicated to the remote control of the image forming apparatus 10 and terminals such as a mobile phone, a tablet terminal, and a smartphone to which a function as the remote operation panel 40 is provided by a predetermined application program.

The image forming apparatus 10 can perform the cooperative operation with the remote operation panel 40 when the operation panel 30 of the image forming apparatus 10 is apposed to and can communicate with the remote operation panel 40. In the cooperative operation, a screen such as an operation screen and a preview screen can be displayed by using one of or both of the display units of the operation panel 30 and the remote operation panel 40. Therefore, a CPU 11 of the image forming apparatus 10 to be described below functions as a display state control unit for controlling display states of the operation panel 30 and the remote operation panel 40. The operation panel 30, the remote operation panel 40, and the like are collectively called "operation display".

For example, in the cooperative operation, when the whole image cannot be displayed on the screen of the operation panel 30, a part which cannot be displayed is displayed on the remote operation panel 40. Also, a screen relating to that on the operation panel 30 is displayed on the remote operation panel 40.

Figure 2:
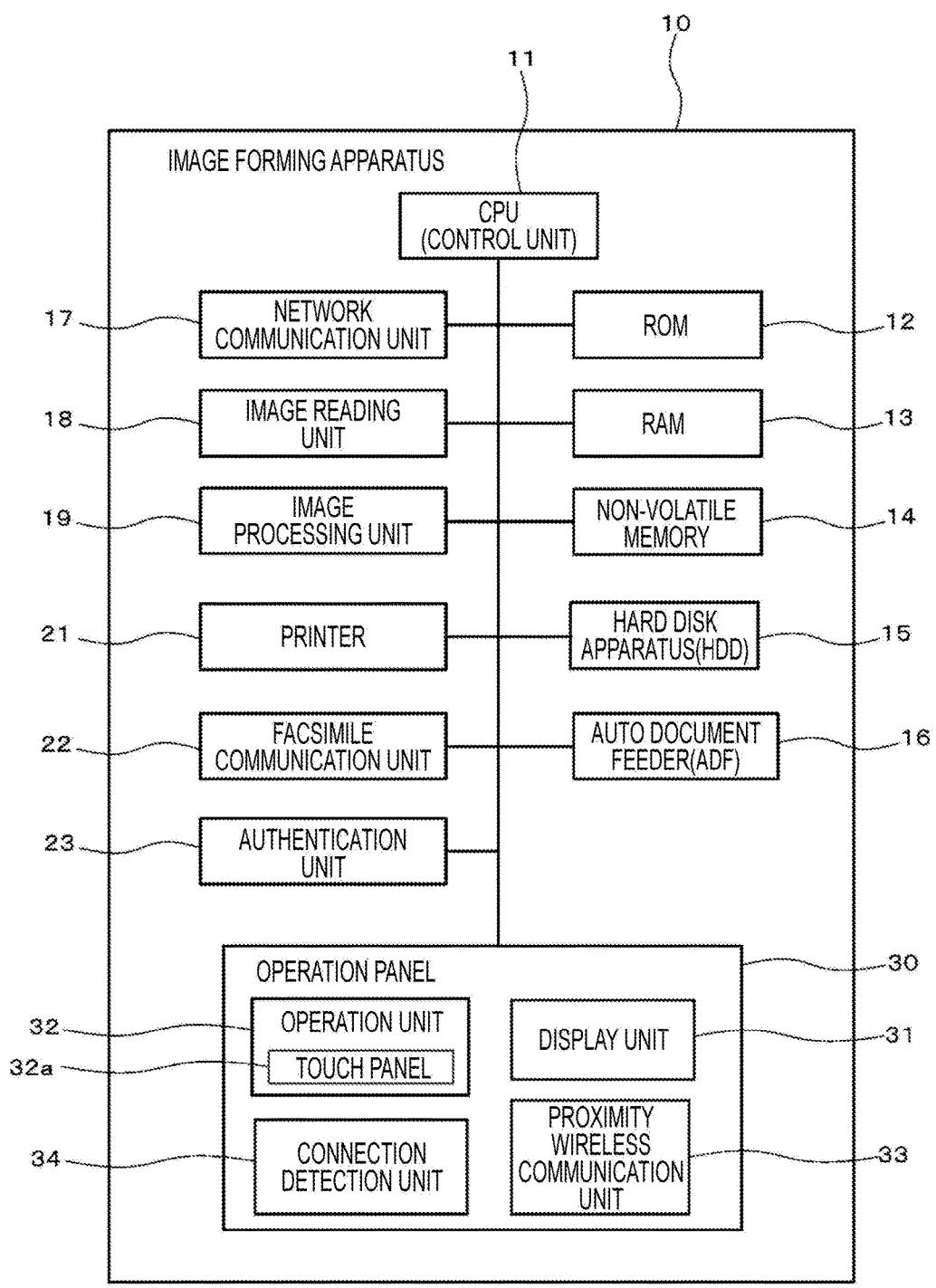
FIG. 2 is a block diagram of an electrical overall configuration of an image forming apparatus.

FIG. 2 is a block diagram of an electrical overall configuration of the image forming apparatus 10. The image forming apparatus 10 has the central processing unit (CPU) 11 as a control unit for generally controlling an operation of the image forming apparatus 10. The CPU 11 is connected to a read only memory (ROM) 12, a random access memory (RAM) 13, a non-volatile memory 14, a hard disk apparatus 15, an auto document feeder (ADF) 16, a network communication unit 17, an image reading unit 18, an image processing unit 19, a printer 21, a facsimile communication unit 22, an authentication unit 23, the operation panel 30, and the like via a bus.

The CPU 11 executes a middleware, an application program, and the like based on an operating system (OS) program. Various programs are stored in the ROM 12, and the CPU 11 executes various processing according to the programs so that each function of the image forming apparatus 10 can be realized. The CPU 11 also functions as the display state control unit for controlling the display state of the operation panel 30.

Here, the CPU 11 also controls the operation panel 30. However, another CPU provided for the operation panel 30 may control the operation panel 30.

The RAM 13 is used as a work memory for temporarily storing various data when the CPU 11 executes the processing based on the program, an image memory for storing the image data, and the like.

The non-volatile memory 14 is a memory (flash memory) in which memory contents are not destroyed even when a power supply is turned off and is used to store various setting information.

The hard disk apparatus 15 is a high-capacity and non-volatile storage device and stores various programs and data in addition to the print data and the image data to display.

The network communication unit 17 performs a function to communicate with the external terminal, a server, and the like connected to the network such as a local area network (LAN).

The image reading unit 18 performs a function to optically read the document and obtain the image data. The image reading unit 18 includes, for example, a light source which irradiates the document with the light, a line image sensor which receives the reflected light and reads the document for one line in a width direction, a moving unit which sequentially moves a reading position per line in a length direction of the document, an optical path including a lens, a mirror, and the like which leads the reflected light from the document to the line image sensor and forms an image, and a converter which converts an analog image signal output by the line image sensor into a digital image data.

The auto document feeder 16 performs a function to sequentially feed the documents which are set on a document tray one by one from the top and make the document pass through the reading position of the image reading unit 18 and eject the document to a predetermined paper ejecting position. The image reading unit 18 includes a function to read the document placed on a platen glass and a function to sequentially read the document fed by the auto document feeder 16.

The image processing unit 19 performs rasterize processing for converting the print data into the image data, compression/decompression processing of the image data, and the like in addition to processing such as magnification, reduction, and rotation of the image.

The printer 21 performs a function to form the image according to the image data on the recording paper. Here, the printer 21 includes a feeding device of the recording paper, a photoreceptor drum, a charging device, a laser unit, a developing device, a transfer separating device, a cleaning device, and a fixing device. The printer 21 is configured as a so-called laser printer which forms the image by electrophotographic process. The image may be formed by using other method.

The facsimile communication unit 22 performs a function to transmit/receive the image data to/from an external device having facsimile functions via a telephone line.

The authentication unit 23 authenticates a user who uses the image forming apparatus 10. The authentication method may be any one of a password, a fingerprint, a vein, and the like.

The operation panel 30 includes a display unit 31, an operation unit 32, a proximity wireless communication unit 33, and a connection detection unit 34. The operation panel 30 performs a function to display various operation screens, setting screens, and the like and a function to receive various operations such as an input of the job from the user.

The display unit 31 includes a liquid crystal display (LCD), a driver of the LCD, and the like. The operation unit 32 includes various hard keys, such as a start button and a numeric keypad, and a touch panel 32a provided on a display surface of the display unit 31. The touch panel 32a detects a coordinate position on the display surface of the display unit 31 touched and operated with a touch pen, a finger, and the like. The operation unit 32 receives a selection operation, a flick operation, a drag operation, and the like via the touch panel 32a. A detection method of the touch panel 32a may be any one of an electrical capacitance, an analog/digital resistance film, infrared rays, ultrasonic waves, electromagnetic induction, and the like.

Figure 4A:
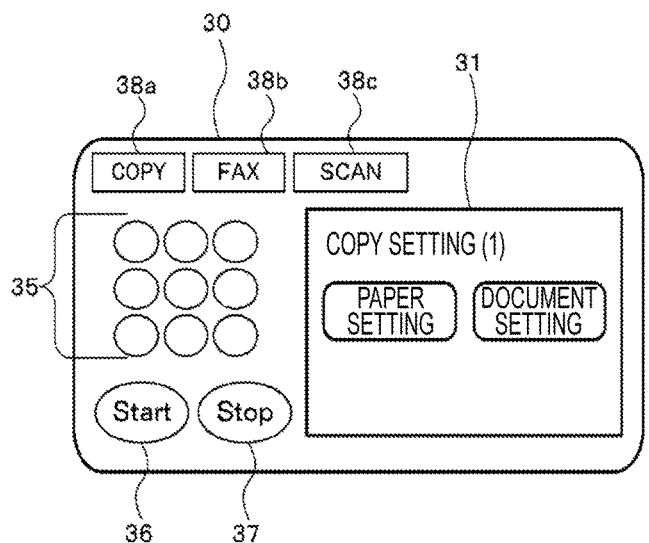
FIG. 4A is a diagram of an exemplary operation panel before a cooperative operation.

As illustrated in FIG. 4A, the operation panel 30 includes a numeric keypad 35, a start button 36, a stop button 37, a function selection button (COPY button 38a, FAX button 38b, SCAN button 38c) to respectively select a copy function, a FAX function, and a SCAN function, and the like as the hard key.

The proximity wireless communication unit 33 performs a function to wirelessly communicate with the remote operation panel 40 arranged adjacent to the operation panel 30. It is enough for the proximity wireless communication unit 33 to have a communicable distance of about 50 cm. Various short distance wireless communication systems can be employed as a communication method.

The connection detection unit 34 detects that the remote operation panel 40 is placed at a predetermined position relative to the operation panel 30. For example, when a dock for holding the remote operation panel 40 is provided on the side of the operation panel 30, the connection detection unit 34 detects that the remote operation panel 40 is mounted to the dock.

Figure 3:
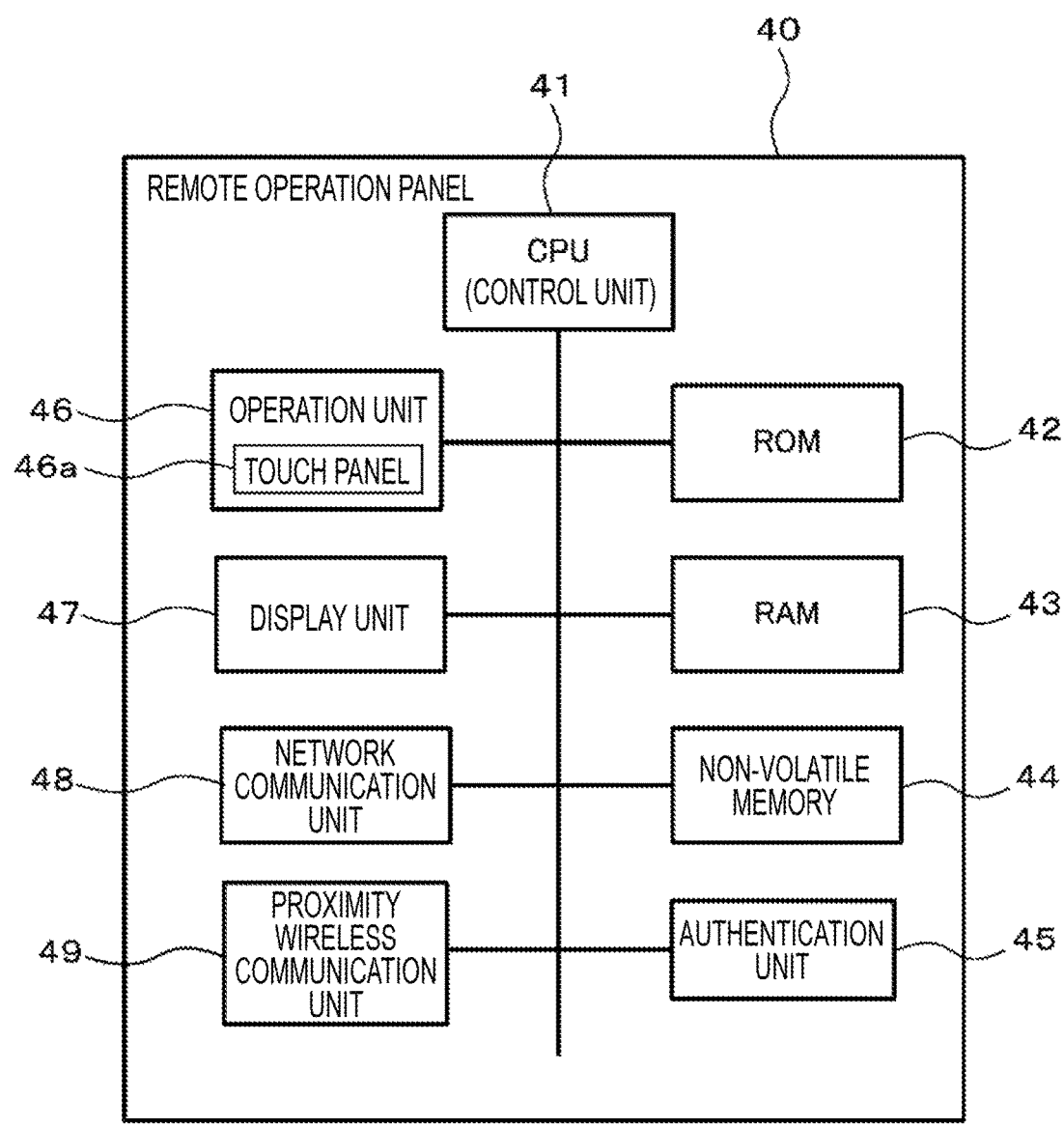
FIG. 3 is a block diagram of an overall configuration of a mobile terminal.

FIG. 3 is a block diagram of an overall configuration of the remote operation panel 40. The remote operation panel 40 includes a CPU 41 for generally controlling the operation of the remote operation panel 40. The CPU 41 is connected to a ROM 42, a RAM 43, a non-volatile memory 44, an authentication unit 45, an operation unit 46, a display unit 47, a network communication unit 48, and a proximity wireless communication unit 49 via a bus.

Various programs and data are stored in the ROM 42 and the non-volatile memory 44, and the CPU 41 executes various processing according to the programs so that functions of the remote operation panel 40 can be realized. The RAM 43 is used as a work memory for temporarily storing various data when the CPU 41 executes the program and a memory for temporarily storing display data.

The non-volatile memory 44 is a memory in which the memory contents are held even when the power supply is turned off. The non-volatile memory 44 stores a document, an image file, content of various settings, user information, terminal information (network address and the like), an application program, a program to execute a function to display the screen based on an instruction from the operation panel 30, and the like.

The authentication unit 45 authenticates the user who uses the remote operation panel 40.

The display unit 47 includes the liquid crystal display and the like.

The operation unit 46 includes a touch panel 46a which is provided on an entire display surface of the display unit 47 and detects a position touched with a finger, a pen, and the like and a few hard keys (operation switch).

The network communication unit 48 performs a function to communicate with various external devices by connecting to the network via the wireless communication. The proximity wireless communication unit 49 performs a function to wirelessly communicate with the proximity wireless communication unit 33 provided adjacent to the operation panel 30. The communicable distance, the communication method, and the like are the same as those of the proximity wireless communication unit 33 of the operation panel 30.

Figure 4B:
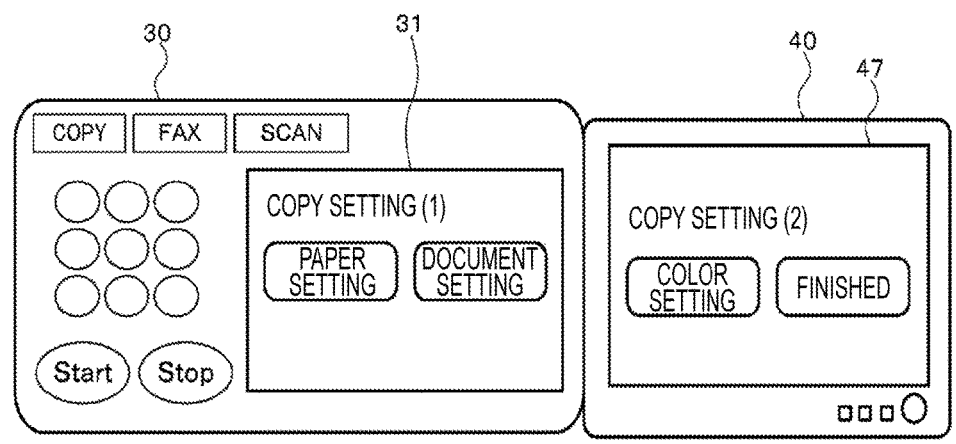
FIG. 4B is a diagram of an exemplary operation panel and remote operation panel immediately after the start of the cooperative operation.

FIGS. 4A and 4B are states before/after the operation panel and the remote operation panel start the cooperative operation. FIG. 4A indicates the operation panel 30 which does not perform the cooperative operation, and FIG. 4B indicates the operation panel 30 and the remote operation panel 40 immediately after the start of the cooperative operation.

In FIG. 4A, an operation screen showing a copy setting (1) is displayed on the display unit 31 of the operation panel 30. When the operation panel 30 is apposed to the remote operation panel 40 and the cooperative operation is started in this state, the state becomes a display state indicated in FIG. 4B. In this example, the operation screen of the copy setting (1) is continuously displayed on the display unit 31 of the operation panel 30, and an operation screen of a copy setting (2) which is a continuous image of the copy setting (1) is displayed on the display unit 47 of the remote operation panel 40.

The starting point of the cooperative operation can be a point of time when a state where the operation panel 30 and the remote operation panel 40 become able to wirelessly communicate has been detected, a point of time when the connection detection unit 34 of the operation panel 30 has detected the mounting of the remote operation panel 40, a point of time when a predetermined sensor of the operation panel 30 detects that the remote operation panel 40 becomes close to the operation panel 30 and that the operation panel 30 becomes able to communicate with the remote operation panel 40, and the like.

The operation panel 30 and the remote operation panel 40 can switch the respective display states to the normal display state and the power saving display state which consumes little power to display than that of the normal display state. In the power saving display state, the image is not displayed or displayed with low luminance.

While allowing the operation panel 30 to be in the power saving display state, the image forming apparatus 10 can perform the cooperative operation with the remote operation panel 40 and execute a job by normally operating the other parts. Also, the image forming apparatus 10 can bring the whole apparatus to the power saving state (so-called sleep state).

Similarly, even when the remote operation panel 40 is in the power saving display state, the remote operation panel 40 can perform the cooperative operation with the operation panel 30 and receive the operation with the hard key. Also, the whole remote operation panel 40 can be in the power saving state.

At least one of the operation panel 30 and the remote operation panel 40 become the normal display state during the cooperative operation, and the operation panel 30 and the remote operation panel 40 are controlled so that both of them do not become the power saving display state at the same time.

Figure 5A:
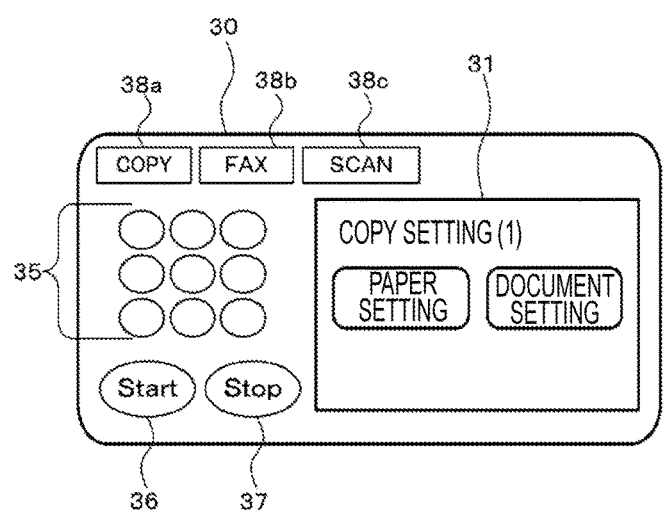
FIGS. 5A and 5B are diagrams of an exemplary state where the operation panel in a power saving display state and a remote operation panel in a normal display state cooperatively operate.
Figure 5B:
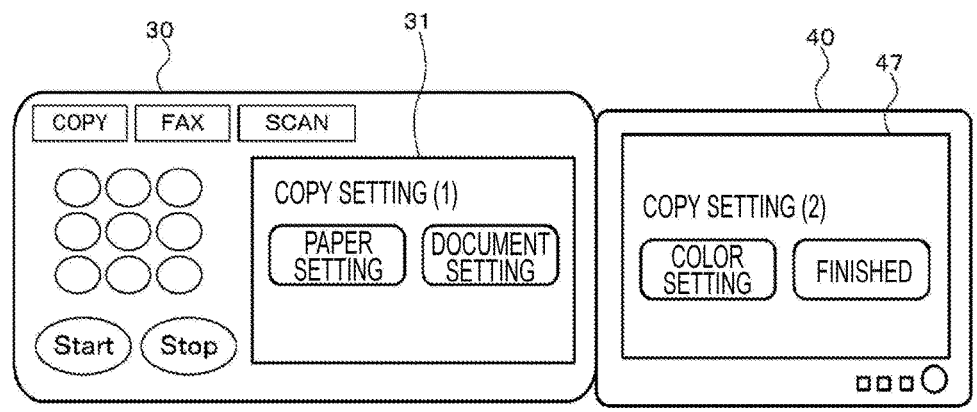

FIGS. 5A and 5B indicates an exemplary state where the operation panel 30 in the power saving display state and the remote operation panel 40 in the normal display state cooperatively operate. For example, in a case where the remote operation panel 40 is apposed to the operation panel 30 of the image forming apparatus 10 and the cooperative operation is started when the operation panel 30 of the image forming apparatus 10 is in the power saving display state, the display unit 47 of the remote operation panel 40 is inquired whether the operation panel 30 is maintained to be in the power saving display state. When the continuous power saving display state is selected, the cooperative operation starts while the power saving display state of the operation panel 30 is maintained. When not to maintain the power saving state is selected, the power saving display state of the operation panel 30 is canceled, and the cooperative operation is started with both panels in the normal display state.

In FIGS. 5A and 5B, the operation panel 30 is in the power saving display state and performs the cooperative operation with the remote operation panel 40. Therefore, when the operation panel 30 is in the normal display state, a home screen, which is displayed on the display unit 31 of the operation panel 30, is displayed on the display unit 47 of the remote operation panel 40 during the cooperative operation.

The user can perform various settings relative to the image forming apparatus 10 by using the remote operation panel 40 in this state. Also, the operation panel 30 receives the operation of the hard key of the operation panel 30 even when the operation panel 30 is in the power saving display state. The operation panel 30 of the image forming apparatus 10 includes the start button 36, the stop button 37, the numeric keypad 35, the COPY button 38a, the FAX button 38b, the SCAN button 38c, and the like. Some users feel that the operations by these hard keys are easy to use.

When the state of the operation panel 30 in the power saving display state is changed to the normal display state according to the operation by these hard keys, a power saving effect is reduced. Especially, when the power saving state of each device of the image forming apparatus 10 is canceled and an initialization operation and the like is performed, a large power is wastefully consumed.

When the hard key such as the COPY button 38a is operated on the operation panel 30 in a case where the operation panel 30 and the remote operation panel 40 are performing the cooperative operation and the operation panel 30 is in the power saving display state, the display system 3 operates such that a screen to be displayed according to the operation with the hard key (it is assumed as a related information screen) is displayed on the display unit 47 of the remote operation panel 40 and the power saving display state of the operation panel 30 is maintained.

Figure 6:
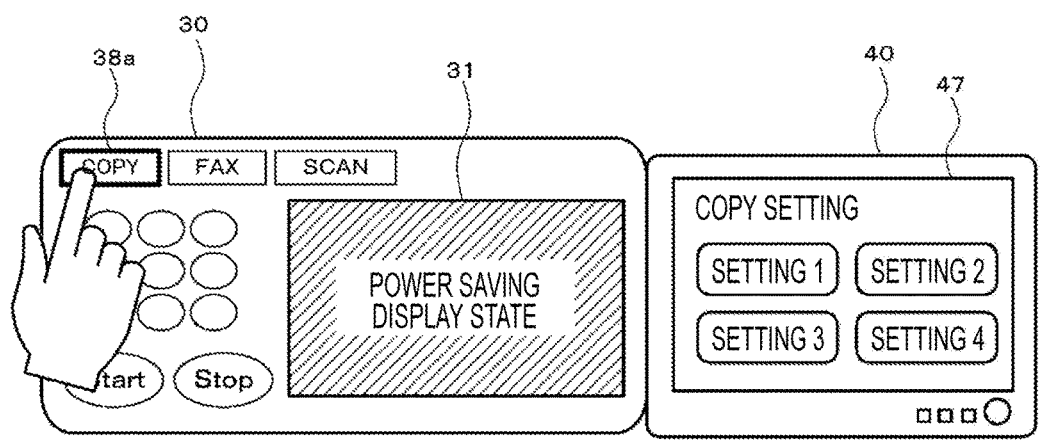
FIG. 6 is a diagram of a change of a display in a case where a user has operated a COPY button of the operation panel in the state of FIGS. 5A and 5B.

FIG. 6 indicates a change of the display in a case where the user has operated the COPY button 38a of the image forming apparatus 10 in the state of FIGS. 5A and 5B. As illustrated in FIG. 6, in a case where the operation panel 30 and the remote operation panel 40 are performing the cooperative operation and the COPY button 38a of the operation panel 30 is operated when the operation panel 30 is in the power saving display state, the power saving display state of the operation panel 30 is maintained and the screen of the copy setting which should be displayed according to the operation of the COPY button 38a is displayed on the display unit 47 of the remote operation panel 40.

Figure 7:
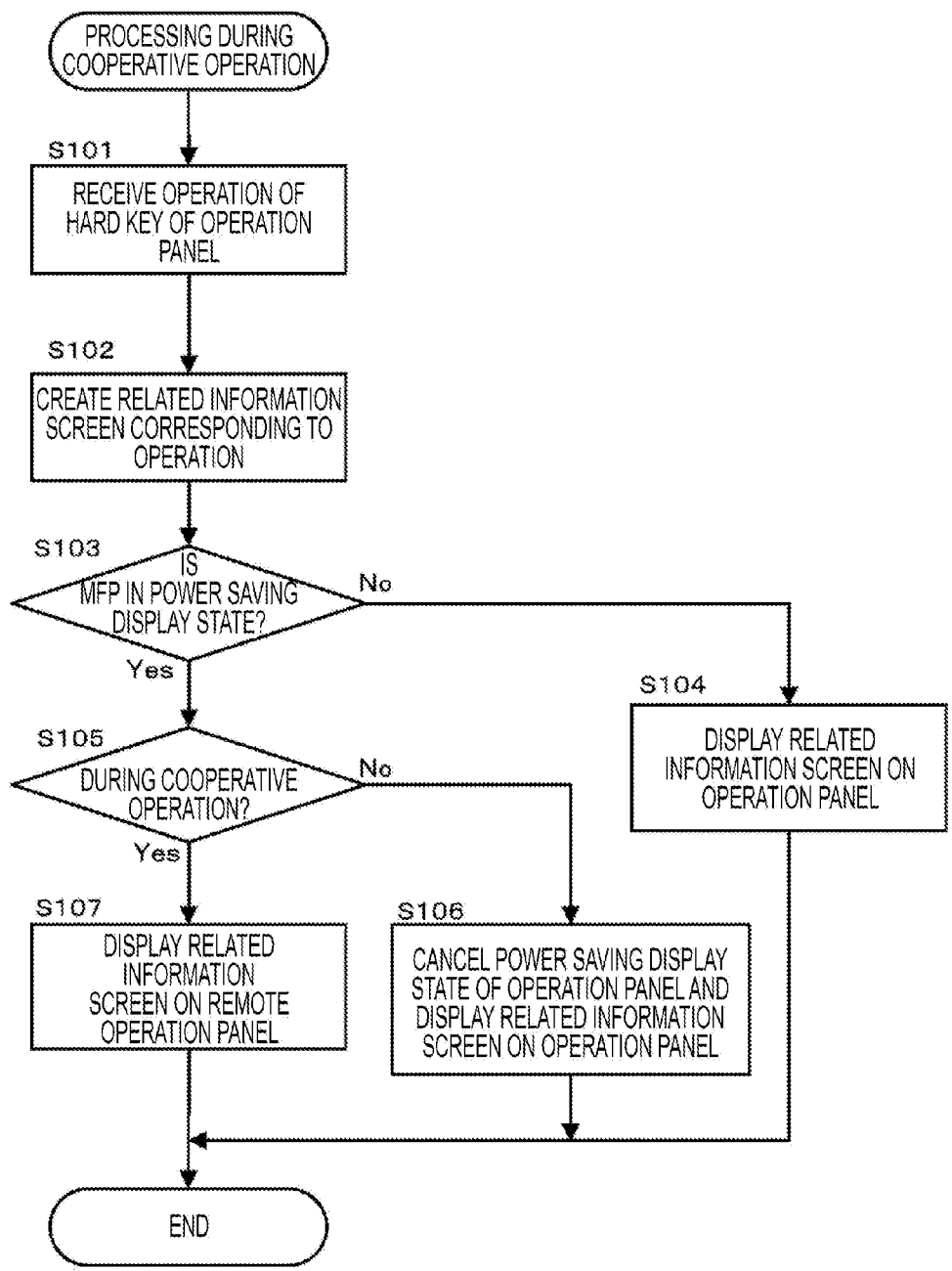
FIG. 7 is a flowchart of a control flow regarding operations illustrated in FIGS. 5A, 5B and FIG. 6.

FIG. 7 indicates a control flow regarding the operations in FIGS. 5A, 5B and FIG. 6. Here, it is assumed that the CPU 11 of the image forming apparatus 10 perform this control. When the operation of the hard key of the operation panel 30 is received during the cooperative operation (step S101), the related information screen corresponding to the operation is created (step S102). The image forming apparatus 10 checks whether the operation panel 30 of the image forming apparatus 10 is in the power saving display state (step S103). When the operation panel 30 is not in the power saving display state (step S103; No), the related information screen is displayed on the display unit 31 of the operation panel 30 (step S104). Then, the procedure ends (END).

When the operation panel 30 is in the power saving display state (step S103; Yes), the image forming apparatus 10 checks whether the operation panel 30 is performing the cooperative operation (step S105). When the operation panel 30 is not performing the cooperative operation (step S105; No), the power saving display state of the operation panel 30 is canceled and changed to the normal display state, and the related information screen is displayed on the operation panel (step S106). Then, the procedure ends (END).

When the operation panel 30 is performing the cooperative operation (step S105; Yes), the power saving display state of the operation panel 30 is continuously maintained, and the related information screen is displayed on the remote operation panel 40 (step S107). Then, the procedure ends (END).

Figure 8:
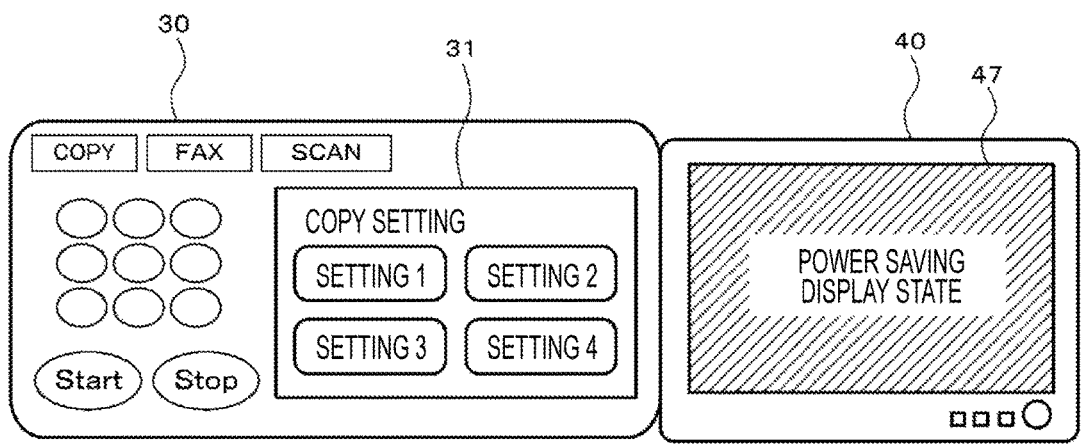
FIG. 8 is a diagram of an exemplary state where the operation panel in the normal display state and the remote operation panel in the power saving display state cooperatively operate.

FIG. 8 indicates an exemplary state where the operation panel 30 in the normal display state and the remote operation panel 40 in the power saving display state cooperatively operate. The copy setting screen is displayed on the display unit 31 of the operation panel 30. Since the remote operation panel 40 is in the power saving display state, the remote operation panel 40 does not display. However, the remote operation panel 40 receives the operation of the hard key.

In this state, the user can perform various settings relative to the image forming apparatus 10 by using the operation panel 30, and at the same time, a predetermined instruction can be input relative to the image forming apparatus 10 by operating the hard key of the remote operation panel 40.

When the hard key is operated on the remote operation panel 40 in a case where the operation panel 30 and the remote operation panel 40 are performing the cooperative operation and the remote operation panel 40 is in the power saving display state, the display system 3 operates such that the related information screen which should be displayed according to the operation of the hard key is displayed on the display unit 31 of the operation panel 30 and the power saving display state of the remote operation panel 40 is maintained.

Figure 9:
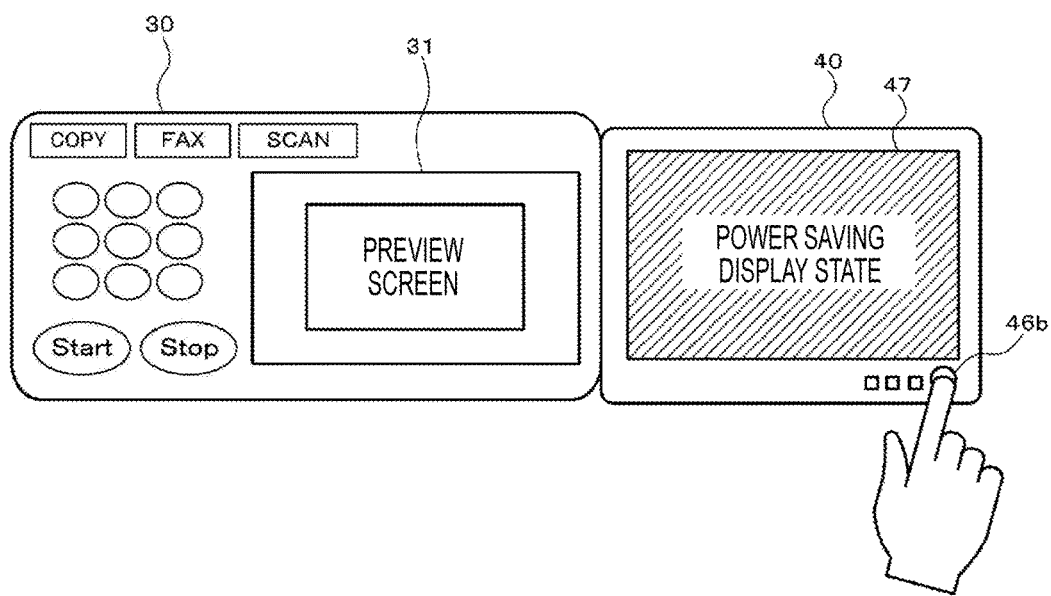
FIG. 9 is a diagram of a change of a display in a case where the user has operated a hard key of the remote operation panel in the state of FIG. 8.

FIG. 9 indicates a change of the display in a case where the user has operated a hard key 46b of the remote operation panel 40 in the state of FIG. 8. As illustrated in FIG. 9, when the hard key 46b of the remote operation panel 40 is operated in a case where the operation panel 30 and the remote operation panel 40 are performing the cooperative operation and the remote operation panel 40 is in the power saving display state, the power saving display state of the remote operation panel 40 is continuously maintained, and the related information screen (a preview screen in the example in FIG. 9) which should be displayed according to the operation of the hard key 46b is displayed on the display unit 31 of the operation panel 30.

Figure 10:
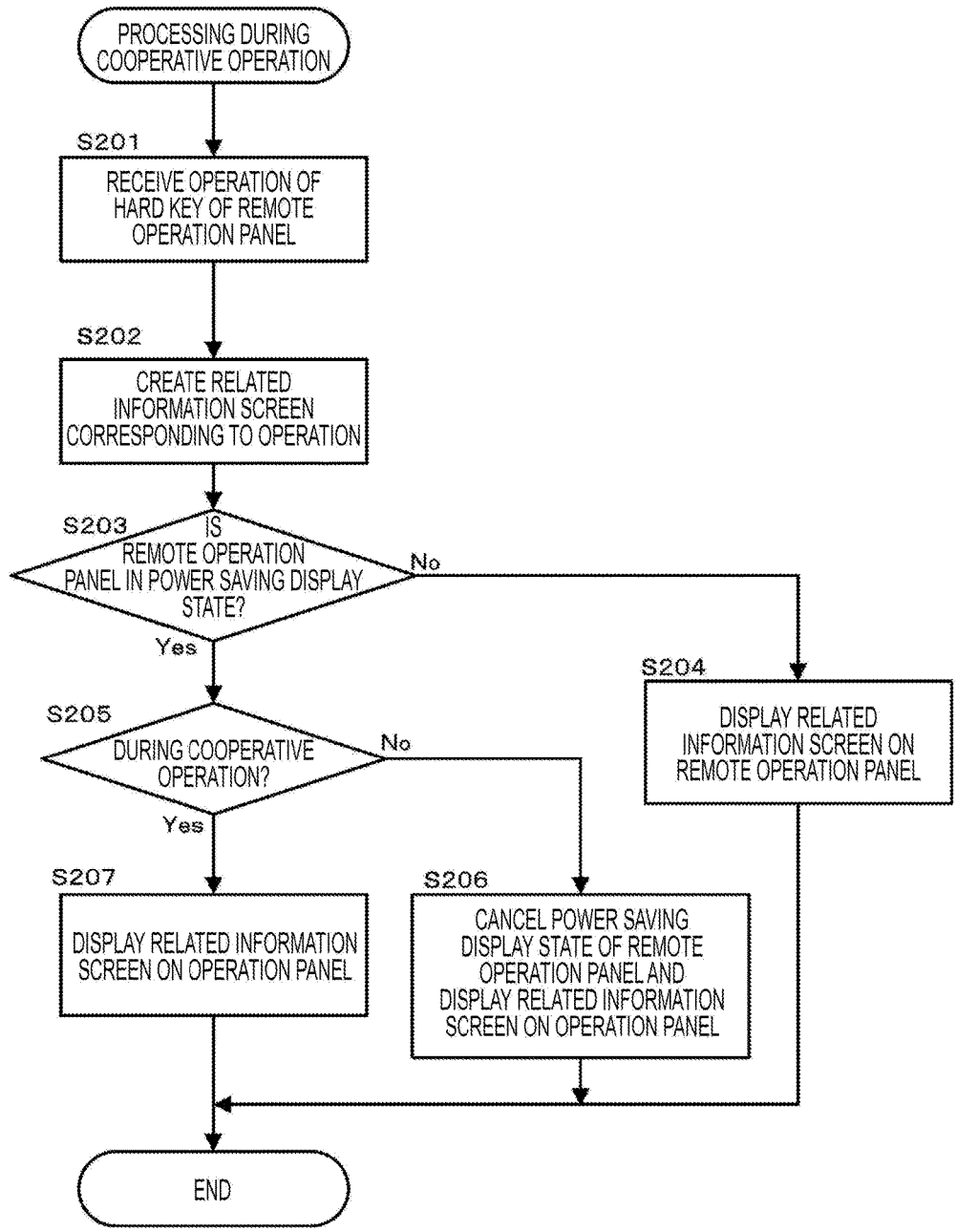
FIG. 10 is a flowchart of a control flow regarding operations illustrated in FIGS. 8 and 9.

FIG. 10 indicates a control flow regarding the operations in FIGS. 8 and 9. It is assumed that the CPU 11 of the image forming apparatus 10 perform this control. That is, the CPU 11 functions as a cooperative control unit which performs the cooperative operation. When the operation of the hard key of the remote operation panel 40 is received during the cooperative operation (step S201), the related information screen corresponding to the operation is created (step S202). The image forming apparatus 10 checks whether the remote operation panel 40 is in the power saving display state (step S203). When the remote operation panel 40 is not in the power saving display state (step S203; No), the related information screen is displayed on the display unit 47 of the remote operation panel 40 (step S204). Then, the procedure ends (END).

When the remote operation panel 40 is in the power saving display state (step S203; Yes), the image forming apparatus 10 checks whether the remote operation panel 40 is performing the cooperative operation (step S205). When the remote operation panel 40 is not performing the cooperative operation (step S205; No), the power saving display state of the remote operation panel 40 is canceled and changed to the normal display state and the related information screen is displayed on the remote operation panel 40 (step S206). Then, the procedure ends (END).

When the remote operation panel 40 is performing the cooperative operation (step S205; Yes), the power saving display state of the remote operation panel 40 is continuously maintained and the related information screen is displayed on the operation panel 30 (step S207). Then, the procedure ends (END).

Next, a display of the notification information which has been generated by the image forming apparatus 10 during the operation such as executing the job will be described.

When some errors such as paper-out and paper jam occur during the job execution, the image forming apparatus 10 displays an error message and the like corresponding to the error as the notification information. In addition, detailed information regarding the job being executed is included in the notification information. For example, the notification information includes the number of read scan which changes for each read, the number of printed sheets which increases for each print (ejection), information such as completion of the read, completion of transmission/reception, end of the job, and the like. The detailed information of the job being executed is notified to the user by sequentially displaying these information.

In a case where the operation panel 30 of the image forming apparatus 10 is in the normal display state when such notification information has been generated, the notification information is displayed on the operation panel 30. Also, when the operation panel 30 of the image forming apparatus 10 is in the power saving display state and is not performing the cooperative operation, the power saving display state of the operation panel 30 is canceled, and the notification information is displayed on the operation panel 30. On the other hand, when the notification information is generated in a case where the operation panel 30 of the image forming apparatus 10 is in the power saving display state and is performing the cooperative operation, the notification information is displayed on the remote operation panel 40.

In a case where the operation panel 30 and the remote operation panel 40 perform the cooperative operation and the remote operation panel 40 sets the job when the operation panel 30 is in the power saving display state, the power saving display state of the operation panel 30 can be maintained. Accordingly, this contributes to the power saving. However, when the error and the like occur during the execution of the job, the power saving display state of the operation panel 30 of the image forming apparatus 10 is normally canceled and an error notification is displayed on the operation panel 30. Accordingly, the power saving effect is reduced by half. When the notification information such as the error notification is generated during the cooperative operation in a case where the operation panel 30 of the image forming apparatus 10 is in the power saving display state, the display system 3 according to the present embodiment displays the notification information on the remote operation panel 40 while maintaining the operation panel 30 in the power saving display state.

Figure 11:
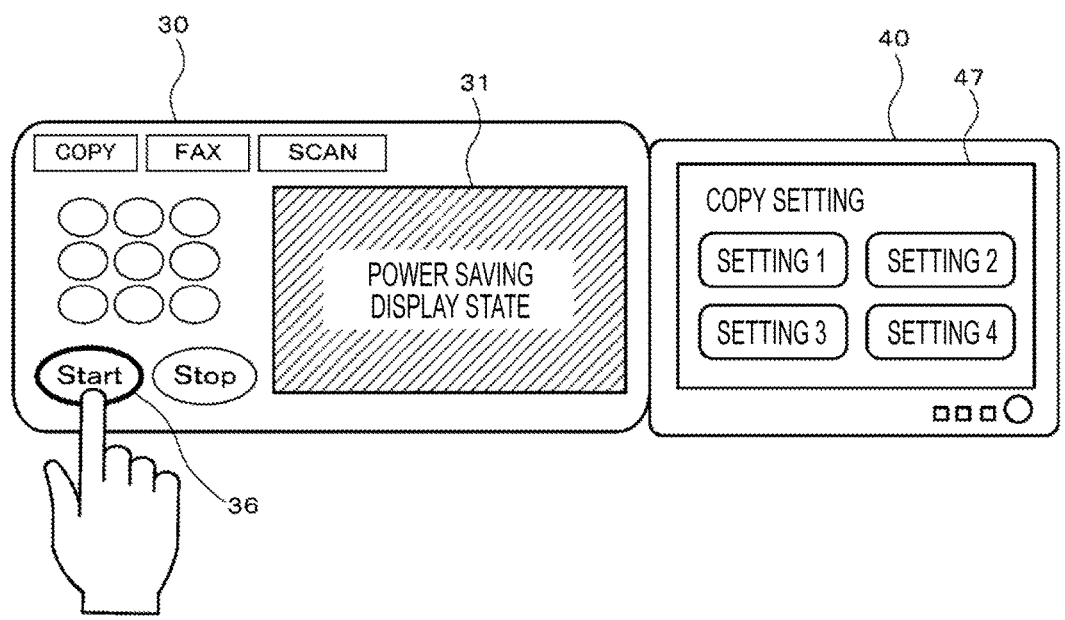
FIG. 11 is a diagram of a state where a setting operation of a job is performed with the remote operation panel and an execution instruction of the job is input by operating a start button of the operation panel in the power saving display state.

FIG. 11 indicates a state where the operation panel 30 in the power saving display state and the remote operation panel 40 in the normal display state perform the cooperative operation, and the job is set by using the remote operation panel 40, and then, the execution instruction of the job is input by operating the start button 36 of the operation panel 30. Accordingly, the image forming apparatus 10 starts to execute the job according to the content set by using the remote operation panel 40.

Figure 12:
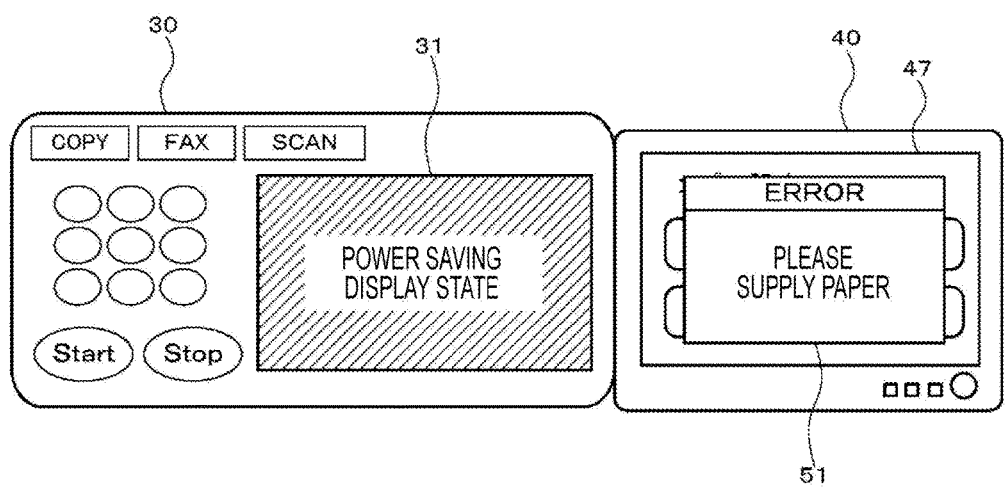
FIG. 12 is a diagram of an exemplary display in a case where the job has been started in a state of FIG. 11 and an error has occurred during the execution of the job.

FIG. 12 is a diagram of an exemplary display in a case where the job has been started in the state of FIG. 11 and an error has occurred during the execution of the job. In this case, since the operation panel 30 is in the power saving display state and the operation panel 30 and the remote operation panel 40 are performing the cooperative operation, the notification information (error message 51) according to the generation of the error is displayed on the remote operation panel 40.

Figure 13:
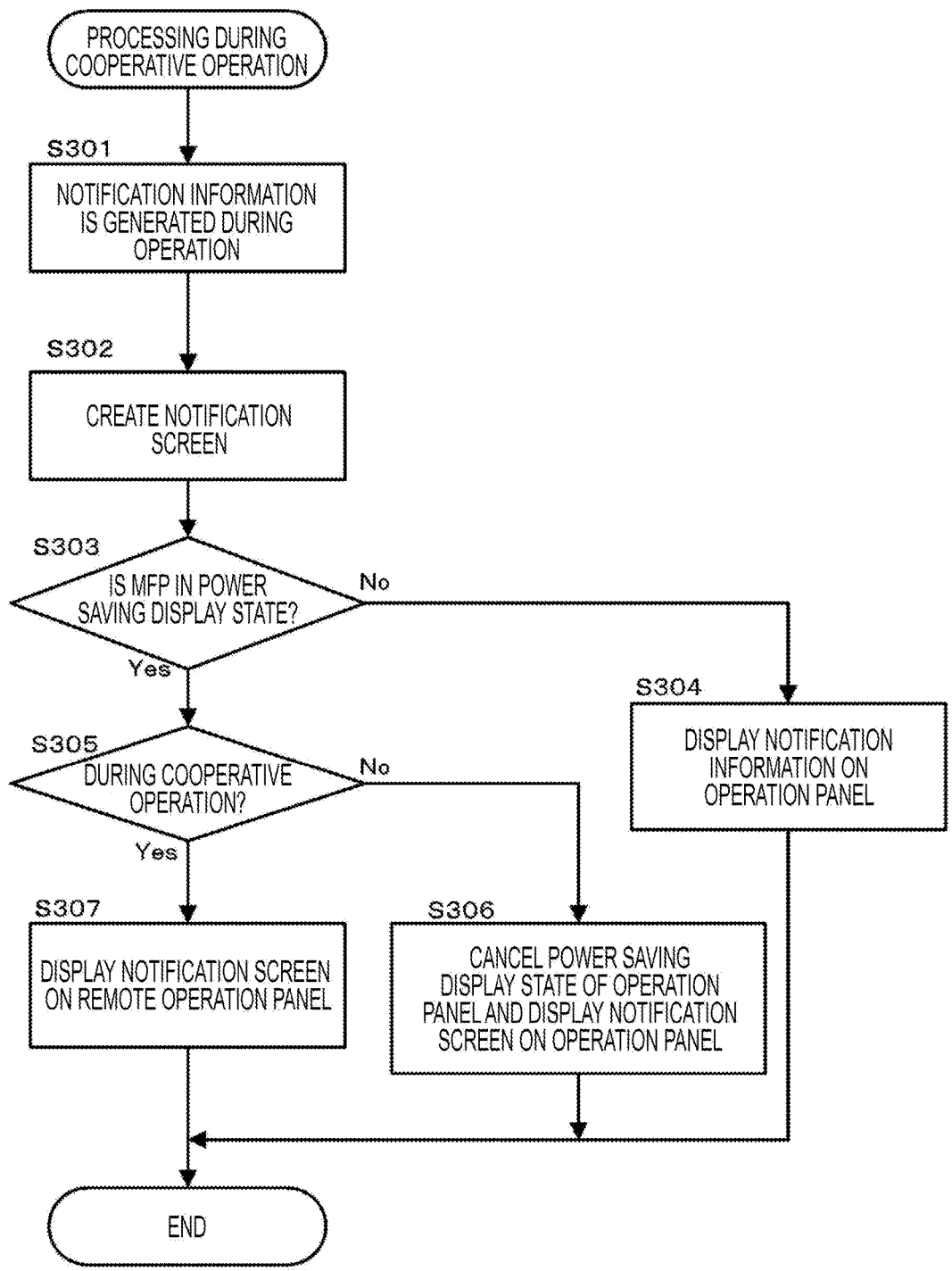
FIG. 13 is a flowchart of a control flow in a case where notification information is generated during the cooperative operation.

FIG. 13 indicates a control flow in a case where the notification information is generated during the cooperative operation. The CPU 11 of the image forming apparatus 10 performs this control. That is, the CPU 11 functions as a notification information generating unit which generates the notification information to the user. When the notification information is generated by the error and the like during the operation of the image forming apparatus 10 (step S301), a notification screen to display the notification information such as the error message 51 is created (step S302).

Next, the image forming apparatus 10 checks whether the operation panel 30 of the image forming apparatus 10 is in the power saving display state (step S303). When the operation panel 30 is not in the power saving display state, that is, the operation panel 30 is in the normal display state (step S303; No), the notification screen is displayed on the display unit 31 of the operation panel 30 (step S304). Then, the procedure ends (END).

When the operation panel 30 is in the power saving display state (step S303; Yes), the image forming apparatus 10 checks whether the operation panel 30 is performing the cooperative operation (step S305). When the operation panel 30 is not performing the cooperative operation (step S305; No), the power saving display state of the operation panel 30 is canceled and changed to the normal display state and the notification screen is displayed on the operation panel 30 (step S306). Then, the procedure ends (END).

When the operation panel 30 is performing the cooperative operation (step S305; Yes), the power saving display state of the operation panel 30 is continuously maintained and the notification screen is displayed on the remote operation panel 40 (step S307). Then, the procedure ends (END).

Next, an operation in a case where the user has touched the touch panel of the display unit in the power saving display state will be described.

When the user has unintentionally touched a touch panel 32a of the operation panel 30 in the power saving display state by mistake, it is not preferable that the power saving display state of the operation panel 30 be canceled according to the operation.

In a case where the operation panel 30 and the remote operation panel 40 are performing the cooperative operation when the user has touched the touch panel 32a of the operation panel 30 in the power saving display state, a selection screen as to whether the power saving display state of the operation panel 30 is canceled is displayed on the remote operation panel 40. Only when the user has selected to cancel the power saving display state, the operation panel 30 is controlled to be changed to the normal display state.

Figure 14:
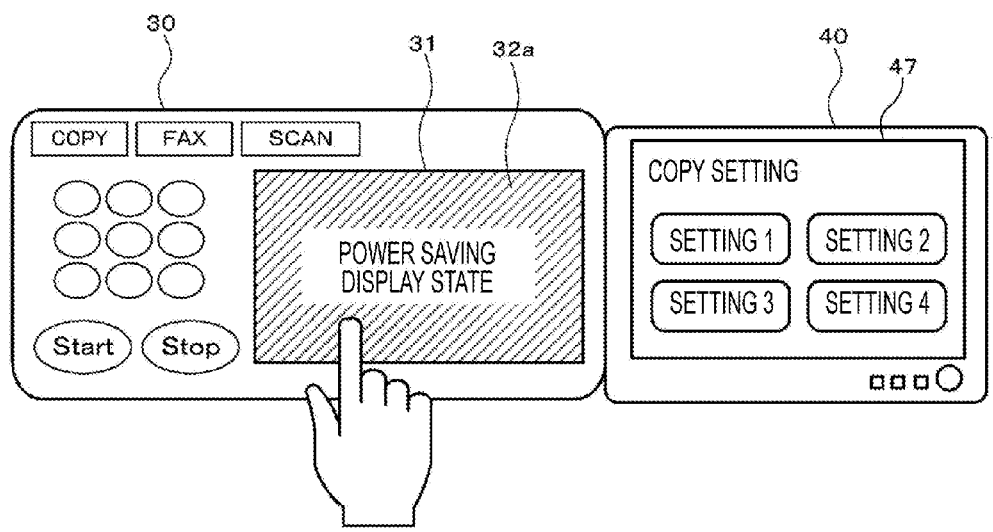
FIG. 14 is a diagram of a state where the user has unintentionally touched a touch panel of the operation panel in the power saving display state with a finger.

FIG. 14 indicates a state where the user has unintentionally touched the touch panel 32a of the operation panel 30 in the power saving display state with the finger.

Figure 15:
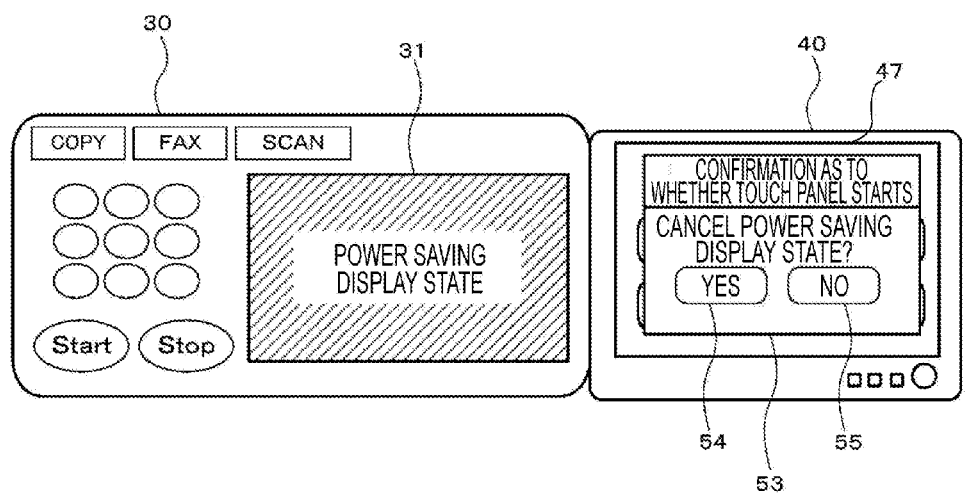
FIG. 15 is a diagram of a state where a selection screen as to whether the power saving display state of the operation panel is canceled is displayed on the remote operation panel.

FIG. 15 indicates a state where a selection screen 53 as to whether the power saving display state of the operation panel 30 is canceled has been displayed on the remote operation panel 40. The selection screen 53 displays a message to inquire whether the power saving display state of the operation panel 30 is canceled or not, a yes button 54 to instruct to cancel it, and a no button 55 to instruct not to cancel it.

Figure 16:
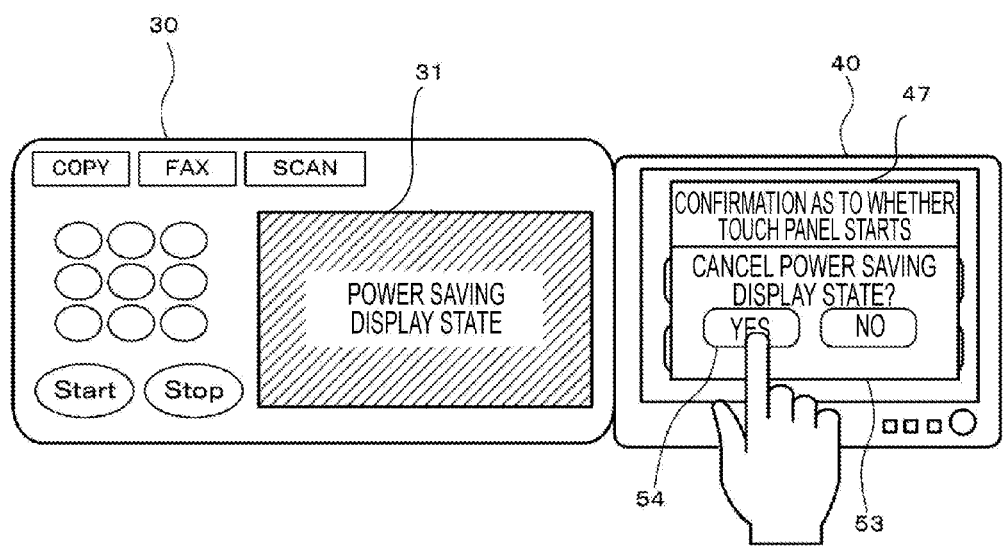
FIG. 16 is a diagram of a state where the user selects a yes button in the state of FIG. 15.

FIG. 16 indicates a state where the user selects the yes button 54 in the state of FIG. 15.

Figure 17:
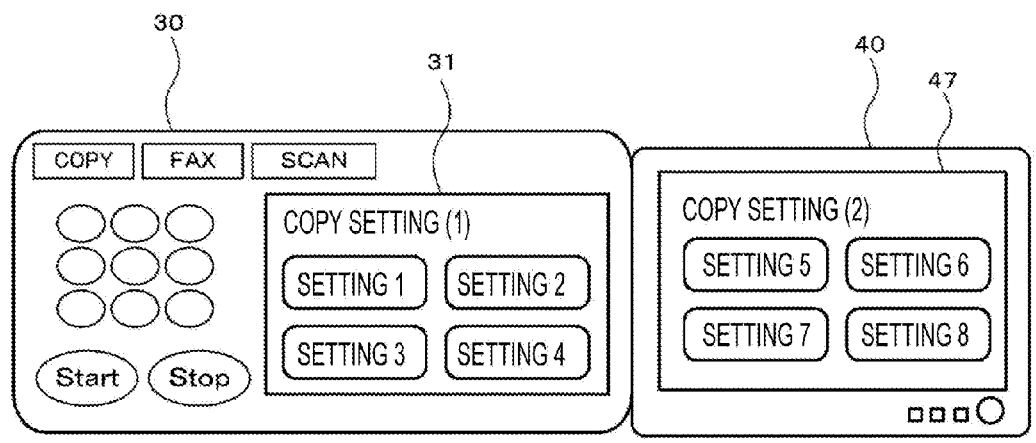
FIG. 17 is a diagram of an exemplary display in a case where the power saving display state of the operation panel is canceled by selecting the yes button and the state is changed to the normal display state.

FIG. 17 indicates an exemplary display in a case where the power saving display state of the operation panel 30 is canceled by selecting the yes button 54 in FIG. 16 and the state is changed to the normal display state. The operation panel 30 becomes the normal display state by selecting the yes button 54, and the operation screen of the copy setting (1) is displayed on the operation panel 30 in this example.

On the remote operation panel 40, the selection screen 53 is deleted and the operation screen of the copy setting (2) is displayed.

When the user has selected the no button 55 on the selection screen 53 in FIG. 16, the selection screen 53 is deleted from the remote operation panel 40. Then, the remote operation panel 40 returns to the display state indicated in FIG. 14.

Figure 18:
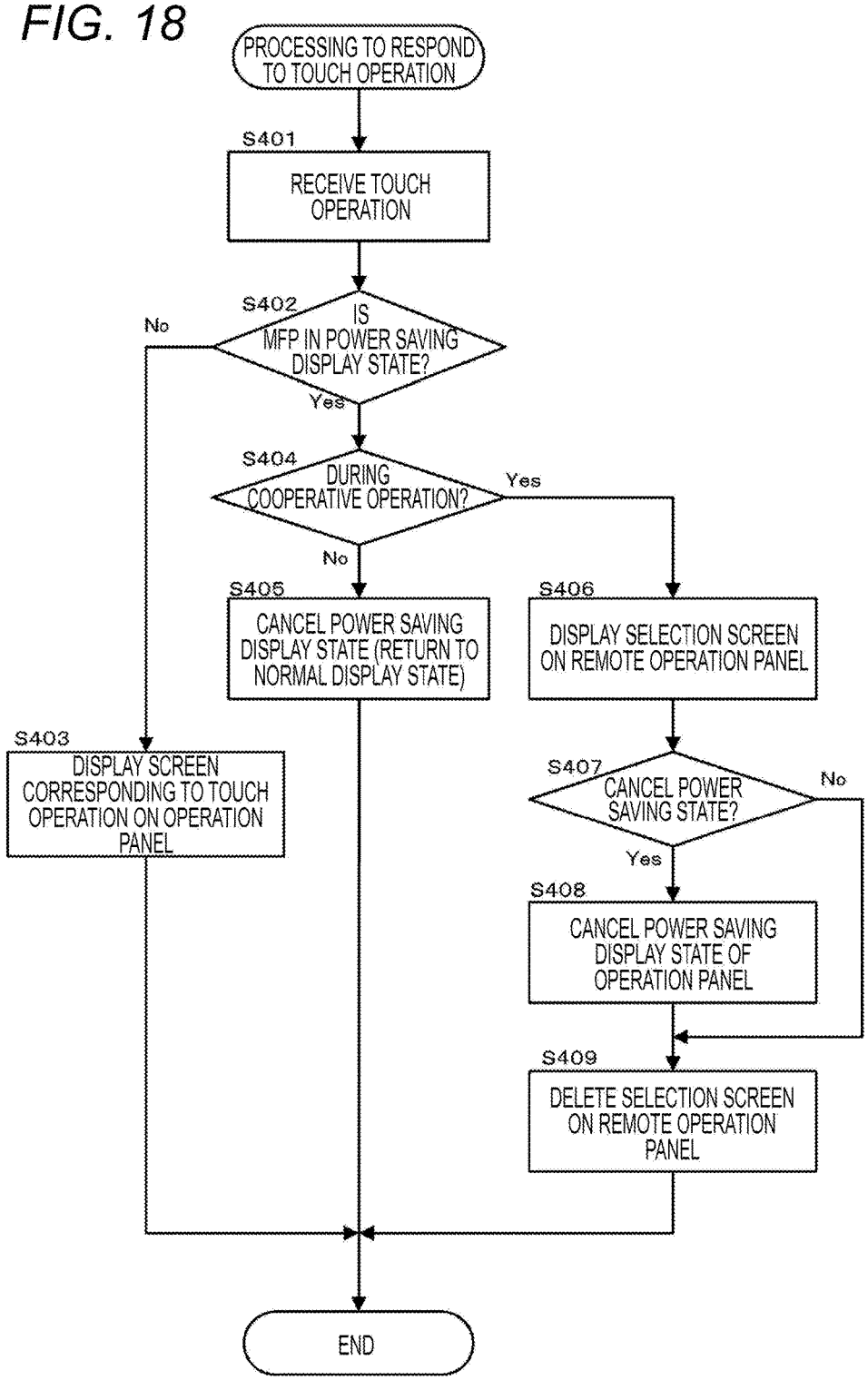
FIG. 18 is a flowchart of control relative to a touch operation.

FIG. 18 is a flowchart of control relative to the touch operation. The CPU 11 of the image forming apparatus 10 performs this control. When the touch panel 32a of the operation panel 30 of the image forming apparatus 10 detects a touch (step S401), the image forming apparatus 10 checks whether the operation panel 30 is in the power saving display state (step S402).

When the operation panel 30 is not in the power saving display state (step S402; No), a screen corresponding to the touch operation is displayed on the operation panel 30 (step S403). Then, the procedure ends (END).

When the operation panel 30 is in the power saving display state (step S402; Yes), the image forming apparatus 10 checks whether the operation panel 30 is performing the cooperative operation (step S404). When the operation panel 30 is not performing the cooperative operation (step S404; No), the power saving display state is canceled and returned to the normal display state (step S405). Then, the procedure ends (END). In step S405, the touch operation of this time may be ignored and the state may be returned to the normal display state by using another method.

When the operation panel 30 is performing the cooperative operation (step S404; Yes), the selection screen 53 is displayed on the remote operation panel 40 (step S406). The selection operation as to whether the power saving display state of the operation panel 30 is canceled is received (step S407).

When the selection operation to cancel the power saving display state of the operation panel 30 has been received on the selection screen 53 (step S407; Yes), the power saving display state of the operation panel 30 is canceled (step S408). At the same time, the selection screen 53 is deleted from the remote operation panel 40 (step S409), and then, the procedure ends (END).

When the selection operation not to cancel the power saving display state of the operation panel 30 has been received on the selection screen 53 (step S407; No), the power saving display state of the operation panel 30 is maintained and the selection screen 53 is deleted from the remote operation panel (step S409). Then, the procedure ends (END).

Embodiments of the present invention have been described above with reference to the drawings. However, the specific structure is not limited to the structure indicated in the embodiments, and the present invention includes an addition and change in a range which does not depart from the scope of the present invention.

In the embodiments, an example has been described in a case where the operation panel 30 fixed to the image forming apparatus 10 is apposed and cooperates to the remote operation panel 40. However, the operation panel 30 can be removed from the image forming apparatus 10 and may be an individual remote operation panel. Also, the present invention is applied to a case where two remote operation panels 40 or the operation panel 30 removed from the image forming apparatus 10 and the remote operation panel apposed to each other can communicate with each other and cooperatively operate with each other.

In the present invention, the operation panel 30 (operation display) is independent from the image forming apparatus 10, and a control unit such as the CPU is provided in the operation panel 30. The control regarding the display state which has been performed by the CPU 11 of the image forming apparatus 10 in the embodiments may be performed by the operation panel 30.

The display system 3 has been exemplified in the embodiments. However, the present invention may be configured as the image forming apparatus 10 which can perform the cooperative operation with a general-purpose mobile terminal and the like, a program for operating two operation displays as the display system 3, and a program for controlling the operation of the image forming apparatus 10.

According to an embodiment of a display system, an image forming apparatus, a program, and a display state control method of the present invention, when two operation displays are performing a cooperative operation and one of the two operation displays is in a power saving state, the power saving state of one of the operation displays is not canceled by a key operation and the like on one of the operation displays against the intention of a user. Accordingly, a power saving effect is maintained.

Although the present invention has been described and illustrated in detail, it is clearly understood that the same is by way of illustrated and example only and is not to be taken by way of limitation, the scope of the present invention being interpreted by terms of the appended claims.

What is claimed is:

1. A printing device comprising:
   a first operation display configured to include an operation unit and a display unit; and
   a hardware processor configured to:
   enable the first operation display to perform a cooperative operation with a second operation display that includes a second operation unit and a second display unit;
   control the first operation display so that when the first operation display is in a power saving display state, where power consumption according to the display is less than that of a normal display state, a state of the first operation display is changed to a normal display state when:
   a predetermined operation has been received via the first operation display when the first operation display is in the power saving display state, and
   the first and second operation displays are not performing the cooperative operation, and
   control the first and second operation displays so that when the first operation display is in the power saving display state, the first operation display is maintained in the power saving display state and the second operation display is caused to issue notification information about the predetermined operation when:
   the predetermined operation has been received via the first operation display when the first operation display is in the power saving display state,
   the second operation display is in the normal display state, and
   the first and second operation displays are performing the cooperative operation.

2. The printing device according to claim 1, wherein the hardware processor is further configured to:
   generate notification information to a user, wherein
   the notification information generated during the operation of the printing device is displayed on the first operation display when the first operation display is in the normal display state, and the notification information generated during the operation of the printing device is displayed on the second operation display when the first operation display is in the power saving display state and the second operation display is in the normal display state during the cooperative operation.

3. The printing device according to claim 2, wherein the notification information is detailed information regarding a job being executed.

4. The printing device according to claim 2, wherein
the notification information is error information regarding an error generated during the execution of the job.

5. The printing device according to claim 1, wherein
the predetermined operation is an operation relative to a predetermined hard key.

6. The printing device according to claim 1, wherein
the predetermined operation includes a touch operation to a touch panel on the display unit.

7. The printing device according to claim 6, wherein
in a case where the touch operation has been received via the first operation display when the first operation display is in the power saving display state, and the second operation display is in the normal display state, and the first and second operation displays are performing the cooperative operation, a selection operation as to whether the power saving display state of the first operation display is canceled is received by the second operation display, and when the operation to cancel the power saving display state of the first operation display is received, a state of the first operation display is changed to the normal display state.

8. A non-transitory recording medium storing a computer readable program for causing a printing device to operate as the printing device according to claim 1, wherein
the printing device includes an operation panel having an operation unit and a display unit.

9. The printing device according to claim 2, wherein the notification information is displayed on the second operation display.

10. The printing device according to claim 2, wherein the second operation display is a mobile terminal.

11. A display system comprising:
the printing device according to claim 1; and
the second operation display.

12. A display state control method performed by a printing device including a first operation display including an operation unit and a display unit, comprising:
changing a state of the first operation display to a normal display state from a power saving display state, where power consumption according to a display is less than that of the normal display state, when a predetermined operation has been received via the first operation display when the first operation display is in a power saving display state, and a second operation display including an operation unit and a display unit is not performing a cooperative operation with the first operation display; and
maintaining the power saving display state of the first operation display, and causing the second operation display to issue notification information about the predetermined operation when the predetermined operation has been received via the first operation display when the first operation display is in the power saving display state and the second operation display is in the normal display state and the first and second operation displays are performing the cooperative operation.

13. An image forming apparatus comprising:
a first operation display configured to include an operation unit and a display unit; and
a hardware processor configured to:
enable the first operation display to perform a cooperative operation with a second operation display that includes a second operation unit and a second display unit;
control the first operation display so that when the first operation display is in a power saving display state, where power consumption according to the display is less than that of a normal display state, a state of the first operation display is changed to a normal display state when:
a predetermined operation has been received via the first operation display when the first operation display is in the power saving display state, and
the first and second operation displays are not performing the cooperative operation, and
control the first and second operation displays so that when the first operation display is in the power saving display state, the first operation display is maintained in the power saving display state and the second operation display is caused to issue notification information about the predetermined operation when:
the predetermined operation has been received via the first operation display when the first operation display is in the power saving display state,
the second operation display is in the normal display state, and
the first and second operation displays are performing the cooperative operation,
wherein in a case where the predetermined operation has been received via the first operation display when the first operation display is in the power saving display state, the second operation display is in the normal display state, and the first and second operation displays are performing the cooperative operation, a selection operation as to whether the power saving display state of the first operation display is canceled is received via the second operation display, and
when the operation to cancel the power saving display state has been received, a state of the first operation display is changed to the normal display state.

14. The image forming apparatus according to claim 13, wherein the hardware processor is further configured to:
generate notification information to a user, wherein
the notification information generated during the operation of the image forming apparatus is displayed on the first operation display when the first operation display is in the normal display state, and
the notification information generated during the operation of the image forming apparatus is displayed on the second operation display when the first operation display is in the power saving display state and the second operation display is in the normal display state during the cooperative operation.

15. The image forming apparatus according to claim 14, wherein the notification information is detailed information regarding a job being executed.

16. The image forming apparatus according to claim 14, wherein the notification information is error information regarding an error generated during the execution of the job.

17. The image forming apparatus according to claim 13, wherein the predetermined operation is an operation relative to a predetermined hard key.

18. The image forming apparatus according to claim 13, wherein the predetermined operation includes a touch operation to a touch panel on the display unit.

19. A display system comprising:
the image forming apparatus according to claim 13; and
the second operation display.

20. A non-transitory recording medium storing a computer readable program for causing an image forming apparatus to operate as the image forming apparatus according to claim 13, wherein
the image forming apparatus includes an operation panel having an operation unit and a display unit.

21. A display state control method, comprising:
in a case where a predetermined operation has been received via a first operation display when the first operation display including an operation unit and a display unit is in a power saving display state where power consumption according to a display is saved less than that of a normal display state and a second operation display including an operation unit and a display unit is not performing a cooperative operation with the first operation display, changing a state of the first operation display to the normal display state; and
in a case where the predetermined operation has been received via the first operation display when the first operation display is in the power saving display state and the second operation display is in the normal display state and the first and second operation displays are performing the cooperative operation, maintaining the power saving display state of the first operation display, and causing the second operation display to issue notification information about the predetermined operation,
wherein in a case where the predetermined operation has been received via the first operation display when the first operation display is in the power saving display state, the second operation display is in the normal display state, and the first and second operation displays are performing the cooperative operation, a selection operation as to whether the power saving display state of the first operation display is canceled is received via the second operation display, and
when the operation to cancel the power saving display state has been received, a state of the first operation display is changed to the normal display state.

* * * * *